United States Patent [19]

Tsai

[11] Patent Number: 4,981,199
[45] Date of Patent: Jan. 1, 1991

[54] HYDRAULIC CYLINDER FOR AN EXERCISER

[75] Inventor: Chin S. Tsai, Taipei Hsien, Taiwan

[73] Assignee: Dah Ken Industrial Co., Ltd., Taipei Hsien, Taiwan

[21] Appl. No.: 408,210

[22] Filed: Sep. 18, 1989

[51] Int. Cl.$^5$ .............................................. F16F 9/20
[52] U.S. Cl. ..................................... 188/312; 92/167;
188/276; 188/322.17
[58] Field of Search .................. 188/312, 322.17, 280,
188/277, 276, 278, 318, 319, 285; 277/173, 174,
175, 176; 92/165 R, 166, 167, 168

[56] References Cited

U.S. PATENT DOCUMENTS

| | | | |
|---|---|---|---|
| 2,196,436 | 4/1940 | Briggs | 188/276 |
| 2,537,424 | 1/1951 | Rossman | 188/322.17 |
| 2,553,912 | 5/1951 | Gervais | 188/312 |
| 2,771,968 | 11/1956 | Mercier | 188/312 |
| 3,446,318 | 5/1969 | Duckett | 188/322.17 |
| 3,547,451 | 9/1970 | Long, Jr. | 188/322.17 |
| 3,972,396 | 8/1976 | Bochnack | 188/312 |
| 4,836,094 | 6/1989 | Meijer et al. | 92/167 |

Primary Examiner—Matthew C. Graham
Attorney, Agent, or Firm—Thomas S. Keaty

[57] ABSTRACT

A double-rod hydraulic cylinder for an exerciser including a casing, a piston assembly and a universal joint. The piston assembly includes a piston head and two piston rods. Two bearings are respectively fixed to an inner wall of each closed end of the casing. A disk-type spring washer, a washer, an oil seal and a disk-like fixing gasket are arranged respectively in series from each bearing to said piston head. Each of the bearings, the disk-like fixing gaskets, the disk-type spring washers, the washers and the oil seals have a central hole in alignment for the piston rods to pass through. The washers, the oil seals and the gaskets are axially slidable a short distance within the casing. The two disk-like fixing gaskets and the piston head together define a first chamber and a second chamber. Each disk-type spring washer is compressed when the piston assembly axially moves in either direction. The hydraulic cylinder further includes an oil pipe. Respective ends of the oil pipe are communicated to the first chamber and the second chamber adjacent to each disk-like fixing gasket. A valve is provided between the two ends of the oil pipe and the speed of the piston head is controlled by operating a knob provided on the valve.

2 Claims, 4 Drawing Sheets

HYDRAULIC CYLINDER FOR AN EXERCISER

BACKGROUND OF THE INVENTION

The present invention relates to an improved hydraulic cylinder, especially to a double-rod cylinder for an exerciser.

A conventional hydraulic cylinder for an exerciser, having a casing and a piston with a single piston rod attached, does not have working fluid filling the cylinder on the side of the piston head which has the piston rod connected. This ram-type cylinder only effectively acts in one direction.

For a conventional double-rod hydraulic cylinder, an oil tank or a reservoir is needed for the working fluid to circulate therethrough. Further to this, if an oil tank or a reservoir is not provided, the working fluid is pressurized within the cylinder and exerts a pressure on the inner walls of the cylinder. The pressure existing therein may reach up to 3000 psi, causing a large increase in temperature. Moreover, the high internal pressure experienced will cause a reduction in the durability of the hydraulic cylinder.

SUMMARY OF THE INVENTION

The primary object of the present invention is to provide an improved hydraulic cylinder for an exerciser, wherein an oil tank or a reservoir is not required in either direction of the movement of the piston.

Another object of the present invention is to provide an improved hydraulic cylinder for an exerciser, wherein disk-type spring washers are provided within the cylinder so as to prevent the cylinder from continuously operating under high pressure.

A further object of the present invention is to provide an oil pipe for the circulation of the working fluid in the hydraulic cylinder. An adjusting button and a valve are provided on the oil pipe to control the speed of the piston.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENTS

Figure 1:
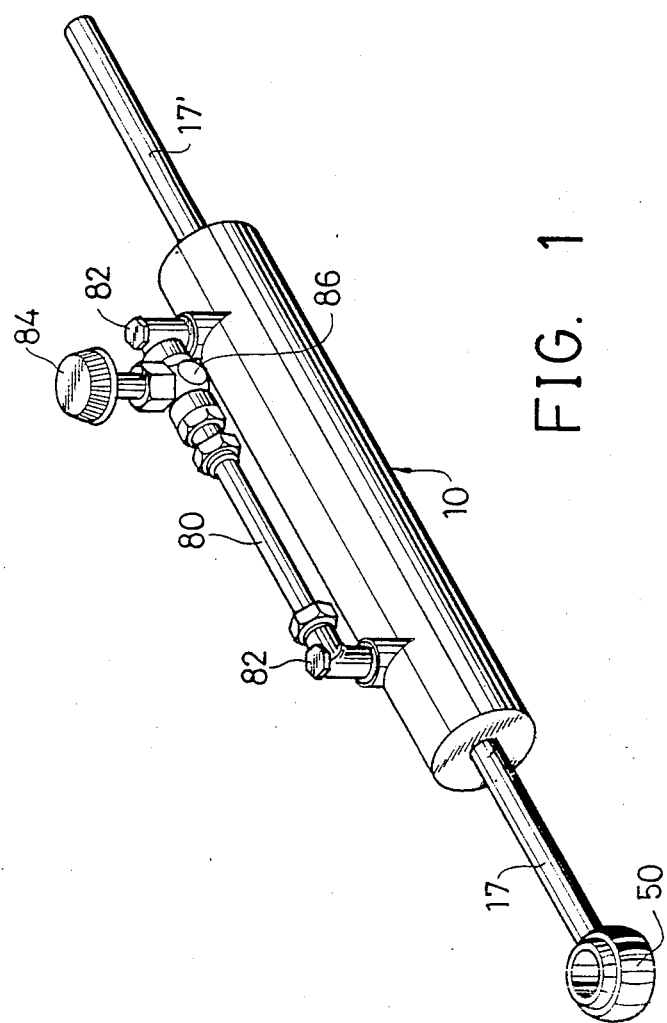
FIG. 1 is a perspective view of a hydraulic cylinder for an exerciser in accordance with the present invention.
Figure 2:
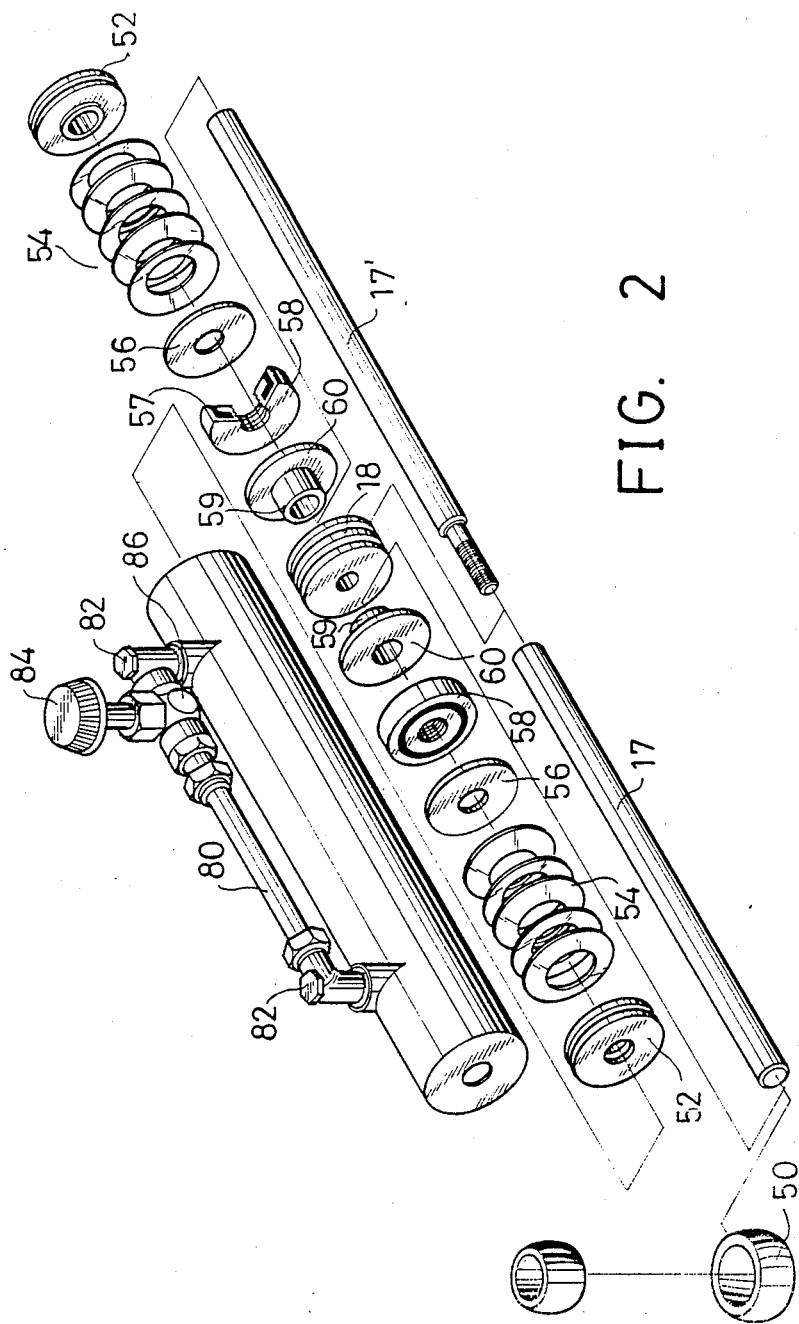
FIG. 2 is an exploded view of a hydraulic cylinder in accordance with the present invention.
Figure 3:
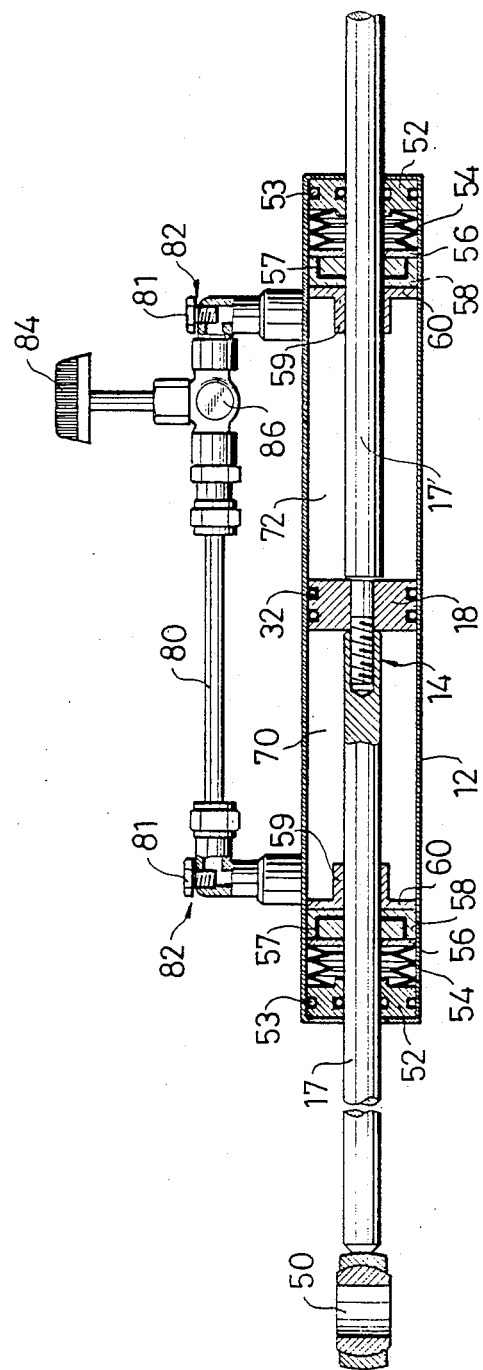
FIG. 3 is a cross-sectional view of the hydraulic cylinder.

Referring to FIGS. 1 to 4, a double-rod hydraulic cylinder 10 for an exerciser is shown. The hydraulic cylinder 10 comprises a casing 12 with a piston assembly 14 provided therein. As a conventional double-rod cylinder, the piston assembly 14 comprises two rods 17 and 17' and a piston head 18. The piston head 18 and the casing together define a first chamber 70 and a second chamber 72. The piston head 18 and the two rods 17 and 17' are assembled in a configuration as shown in FIG. 3.

The piston head 18 has an annular oil seal 32 provided on a periphery thereof. The rods 17 and 17' respectively penetrate each closed end of the casing 12. A distal end of one rod 17 is attached to a universal joint 50 which is fixed on the exerciser.

As shown in FIGS. 1 to 4, the features of the hydraulic cylinder according to the present invention are characterized in that a bearing 52 is fixed to an inner wall at each closed end of the cylinder casing 12. Each bearing 52 is provided with an annular oil seal 53 at a periphery thereof. A disk-type spring washer 54, a washer 56, an oil seal 58 and a disk-like fixing gasket 60 are arranged respectively in series from each bearing 52 to the piston head 18. Each disk-like fixing gasket 60 has an annular protrusion 59 formed thereon.

The two disk-like fixing gaskets 60 and the piston head 18, respectively, define a first chamber 70 and a second chamber 72 therebetween. The bearings 52, the disk-type spring washer 54, the washers 56, the oil seal 58 and the disk-like fixing gaskets 60 all have a central bore for the piston rods 17, 17' to pass through. The washers 56, the oil seals 58, and the disk-like fixing gaskets 60 are axially slidable a short distance within the casing. The disk-type spring washers 54 are designed to reduce an inner pressure produced by a movement of the piston head 18 within the cylinder. A plurality of iron rings 57 are provided within each oil seal 58 for reinforcing the oil seal 58 so as to prevent the deformation of the oil seal 58 due to the internal pressure produced within the two chambers 70, 72.

The hydraulic cylinder 10 according to the present invention further comprises an oil pipe 80. The oil pipe 80 has respective ends communicated to the first chamber 70 and the second chamber 72 adjacent to a shoulder portion of the disk-like fixing gasket 60. A valve 86 is provided on the oil pipe 80. A knob 84 is provided above the valve 86 such that the valve 86 is actuated by operating the knob 84, so as to further close or open the oil path within the oil pipe 80. The flow within the oil pipe 80 is thereby determined which in turn determines the speed of the piston. A cap 82 is provided on each side of the valve 86. Each cap 82 has an oil feeding inlet 81 provided thereon. A user may feed working fluid into the first chamber 70 and the second chamber 72 via the oil feeding inlets 81.

Figure 4:
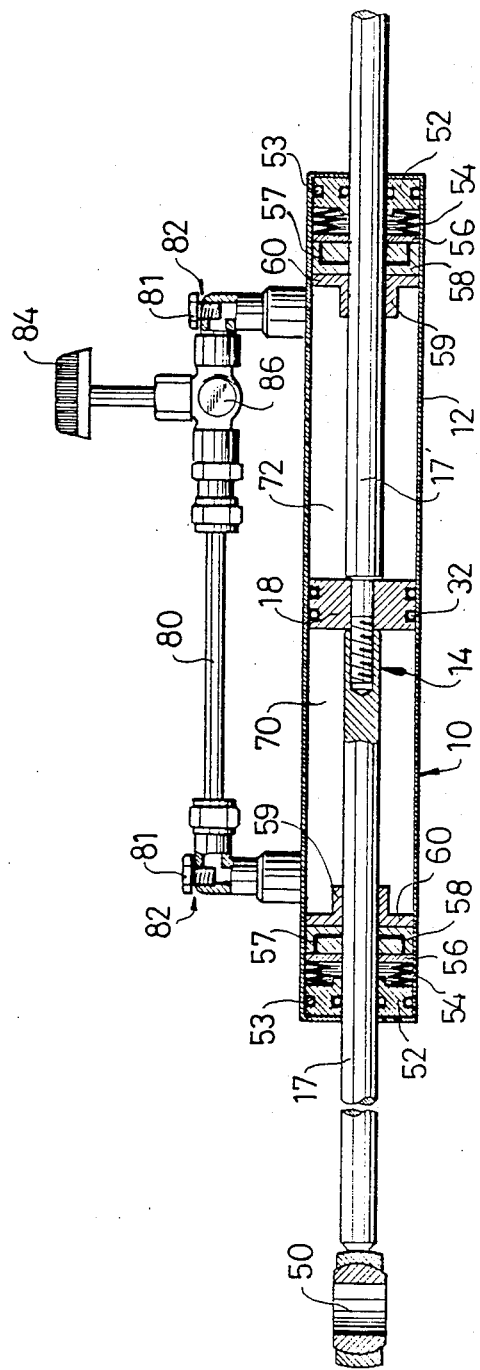
FIG. 4 is a cross-sectional view of the hydraulic cylinder showing the action of the two disk-type spring washers.

Referring to FIG. 4, when the piston moves in a rightward direction, the fluid within the second chamber 72 is pressurized and the temperature within the casing 12 is increased. An amount of fluid flows from the second chamber 72 to the first chamber 70 via the oil pipe 80. Therefore, the increase of temperature within the casing 12 due to the movement of the piston head 18 is reduced. Furthermore, the two disk-type spring washers 54 provided inside each end of the casing 12 also absorb a part of the pressure caused by the compression of the fluid when the piston head moves rightward. Accordingly, the increase in temperature is largely reduced. Conversely, when the piston head 18 moves in a leftward direction, the increase in temperature due to the movement of the piston head 18 is reduced by the afore mentioned operations. It will be appreciated that the disk-type spring washers 54 can be replaced by springs or elastic materials. For a conventional hydraulic cylinder, the temperature within the cylinder often reaches 140° C. to 150° C. By the provision of the hydraulic cylinder of the present invention, the temperature therein is reduced to 120° C. to 130° C.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A hydraulic cylinder for an exerciser, comprising a casing, a double-action piston assembly, and a universal joint, said piston assembly including a piston head, and two piston rods provided on each side of said piston head, each piston rod penetrating each closed end of said casing and protruding therefrom, one of the free ends of said two rods being attached to said universal joint which is fixed on the exerciser, said hydraulic cylinder being characterized in further comprising:

a bearing being fixed to an inner wall of each said closed end of said casing, a disk-type spring washer, a washer, an oil seal and a disk-like fixing gasket being arranged respectively in series from each said bearing to said piston head; said bearings, said disk-like fixing gaskets, said washers, said disk-type spring washers, and said oil seals each having a central hole in alignment for said piston rods to pass through, said washers, said oil seals and said disk-like fixing gaskets being axially slidable a short distance within said casing, said two disk-like fixing gaskets and said piston head casing together defining a first chamber and a second chamber therebetween, each said disk-type spring washer being compressed under increasing pressure in the first chamber and the second chamber upon continuous axial back and forth movements of said piston assembly within said hydraulic cylinder; said hydraulic cylinder further comprising an oil pipe, respective ends of said oil pipe being communicated to said first chamber and said second chamber adjacent to each said disk-like fixing gasket, a valve being provided on said oil pipe and a knob being provided above said valve such that the flow within said oil pipe is adjusted by operating said knob.

2. A hydraulic cylinder as claimed in claim 1, wherein iron rings are provided within each said oil seal for reinforcing said oil seal.

* * * * *